United States Patent [19]
Lidov

[11] 4,045,096
[45] Aug. 30, 1977

[54] SPOKELESS WHEEL AND SHROUD THEREFOR

[75] Inventor: Arthur Lidov, Poughquag, N.Y.

[73] Assignee: The Spokeless Wheel Patent Proceeds Partnership, Poughquag, N.Y.

[21] Appl. No.: 671,620

[22] Filed: Mar. 29, 1976

[51] Int. Cl.² .............................................. B62D 55/00
[52] U.S. Cl. ............................................ 305/7; 308/26; 16/26; 301/5 R
[58] Field of Search ....................... 301/1, 2, 5 R, 5 P; 308/26, 46; 280/281, 200, 210; 305/6, 7, 16, 17; 16/18 R, 44, 46, 26

[56] References Cited
U.S. PATENT DOCUMENTS

| 1,186,244 | 6/1916 | Szostak et al. | 16/44 |
| 3,329,444 | 7/1967 | Lidov | 280/281 R |
| 3,368,822 | 2/1968 | Treiber | 301/5 R |
| 3,395,949 | 8/1968 | Kun | 308/26 |

FOREIGN PATENT DOCUMENTS

| 478,549 | 2/1953 | Italy | 301/5 |
| 1,227 | 12/1907 | United Kingdom | 305/7 |

*Primary Examiner*—Robert B. Reeves
*Assistant Examiner*—H. Grant Skaggs

[57] ABSTRACT

A spokeless wheel which comprises a shroud in which a rotor (or hoop) is rotatably disposed and lateral bearings to laterally stabilize the rotor within the shroud. A series of resiliently mounted bearings are spaced about the shroud for rotatably retaining the rotor (or hoop) within the shroud and for transmitting load and for absorbing any impact forces imparted to the rotor as it rolls over the ground.

16 Claims, 13 Drawing Figures

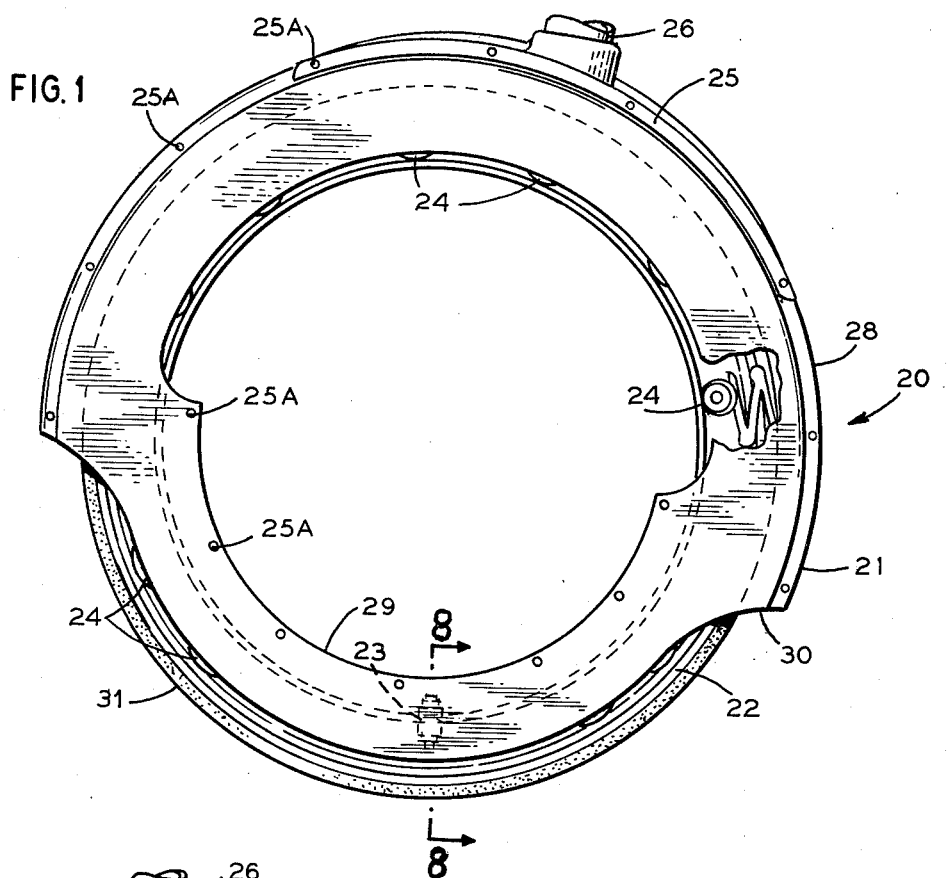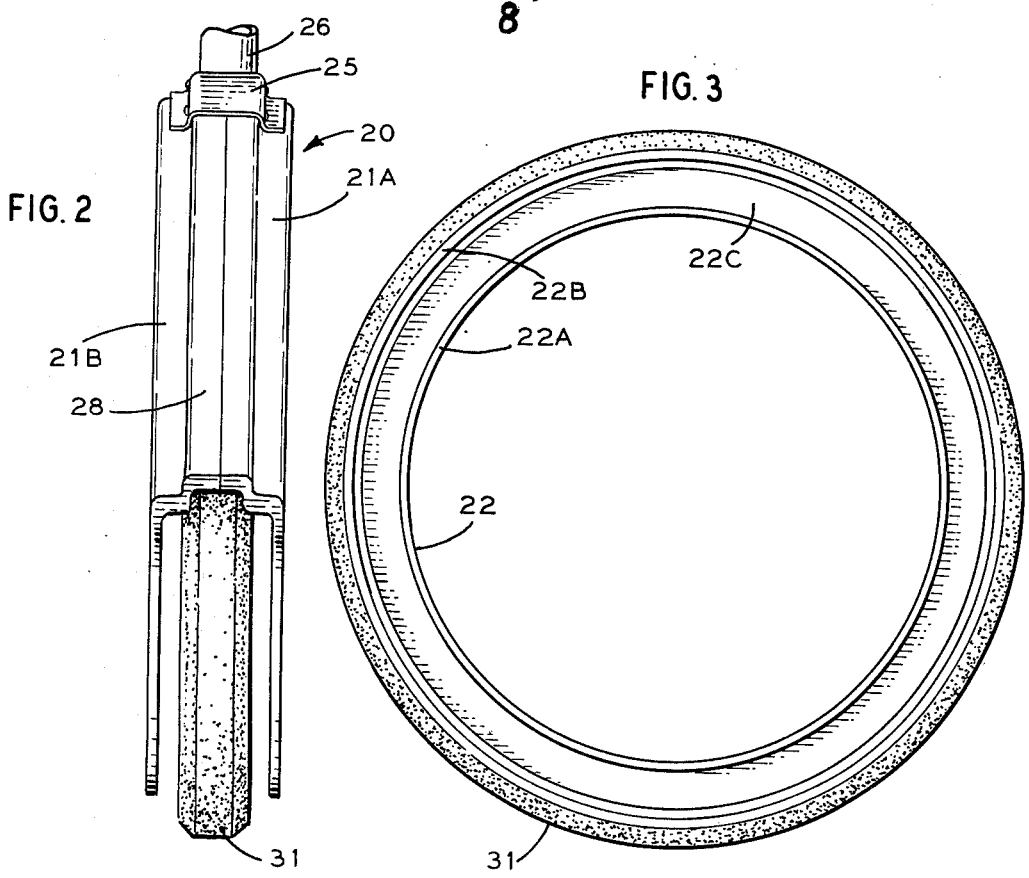

SPOKELESS WHEEL AND SHROUD THEREFOR

PROBLEM AND PRIOR ART

This invention relates to improvments in the spokeless wheel arrangement disclosed in my U.S. Pat. No. 3,329,444 granted July 4, 1967.

Heretofore, wheeled vehicles, e.g., bicycles, tricycles, and such utilized spoke type wheels. Such spoke type wheels have often times proven to be hazardous in that riders or passengers of such vehicles have been seriously injured by such wheels in the event of a fall or spill. Also, children in particular, would often times have a foot or arm mangled by inadvertently becoming entangled with a spoked wheel while it is rotating.

BRIEF SUMMARY OF INVENTION

This invention is a spokeless wheel for use in a bicycle, tricycle, and more generally in other types of wheeled vehicles.

The spokeless wheel comprises a shroud formed of at least two similarly formed complementary members in which a spokeless rotor or hoop is rotatably journalled. Two or more centering bearings are circumferentially located within the shroud on each side of the rotor to confine the rotor to its plane of rotation. Other resiliently mounted bearings are circumferentially located within the shroud on each side of the rotor and are disposed in rolling engagement with the rotor. The resiliently mounted bearings function to rotatably retain the rotor within the shroud and to absorb impact to the rotor as it rolls over the ground or collides with impediments.

A feature of the invention is the provision of a spokeless wheel which is safe and which precludes the wringer injury; frequently inflicted by spoked wheels.

Another feature is the provision of a spokeless wheel whose interior space, free of spokes and hub, can be used to carry packages or other freight.

Various features and advantages will become more readily apparent when considered in view of the drawings and specification, in which:

FIG. 1 is a side elevation view of spokeless wheel assembly embodying the invention.

FIG. 2 is a front elevation view of the spokeless wheel assembly of FIG. 1.

FIG. 3 is a detail side view of the spokeless wheel rotor, shown partly hidden in FIGS. 1 and 2.

DETAILED DESCRIPTION

Figure 4:
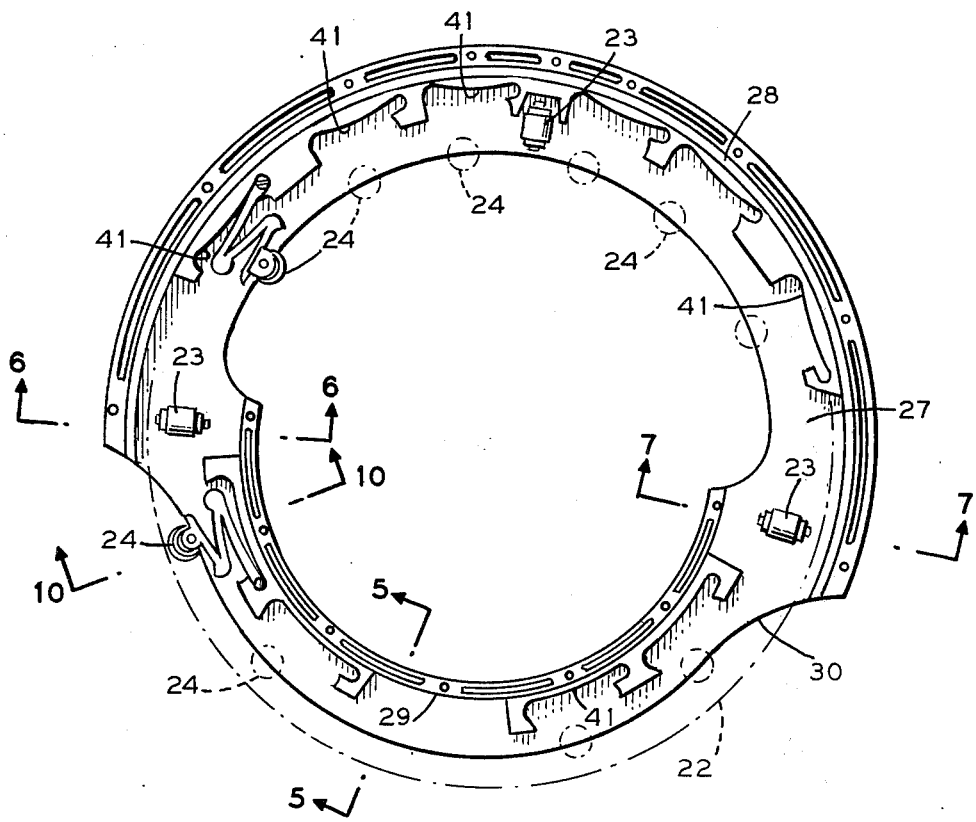
FIG. 4 is a detailed inside view of the shroud of the spokeless wheel shown in FIGS. 1 and 2.
Figure 5:
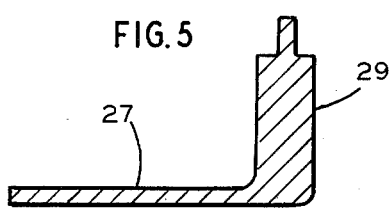
FIG. 5 is a sectional view taken along line 5—5 on FIG. 4.
Figure 6:
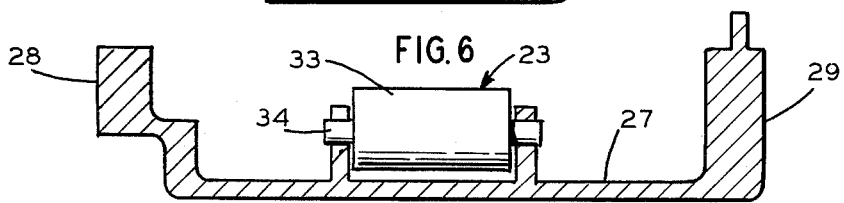
FIG. 6 is a sectional view taken along line 6—6 on FIG. 4.
Figure 7:
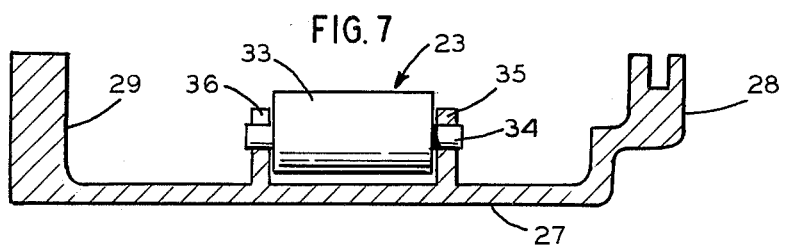
FIG. 7 is a sectional view taken along line 7—7 on FIG. 4.

Referring to the drawings there is shown, in FIGS. 1 and 2, a spokeless wheel 20 embodying the invention. The wheel includes a shroud 21, a rotor or hoop 22, centering bearings 23, resiliently mounted bearings 24, and a fork 25.

The shroud 21 is made up of two similar or identical complementary shells or members 21A, 21B (FIG. 2) which are abutted together as seen in FIG. 2 and secured in assembled position by suitable fasteners 25A. (FIG. 1). A functional fork member comprises a post 26 (FIG. 1) and a clamp or clip 25 which circumscribes any upper peripheral portion of the shroud to transmit steering torque from handlebars to the spokeless wheel, and also functions to additionally secure the shroud members 21A and 21B together. The clamp 25, contiguous with a circumferential portion of the shroud 21, functions also to oppose spreading forces which may be exerted on the shroud by rotor torque during turning or by impact.

As shown in FIGS. 1 and 2 shroud members 21A, 21B can, but need not necessarily be, identical. Referring more particularly to FIGS. 4, 5, 6, and 7 each shroud section or member 21A, 21B comprises an annular side wall portion 27. Connected to the upper portion of the side wall 27 and extending approximately throughout 180' of the circumference thereof is a laterally extending top wall portion 28. Circumscribing the bottom half portion of the side wall portion 27 about the inner periphery thereof is a bottom top wall portion 29 extending laterally of the side wall portion 27. The lower half of the side wall portion 27 is shaped as at 30, (FIG. 4) to define a reduced portion, thus permitting the rotor (or hoop) 22 (FIG. 4) to project beyond the lower peripheral portion of the shroud side wall 27 and touch the ground.

Figure 10:
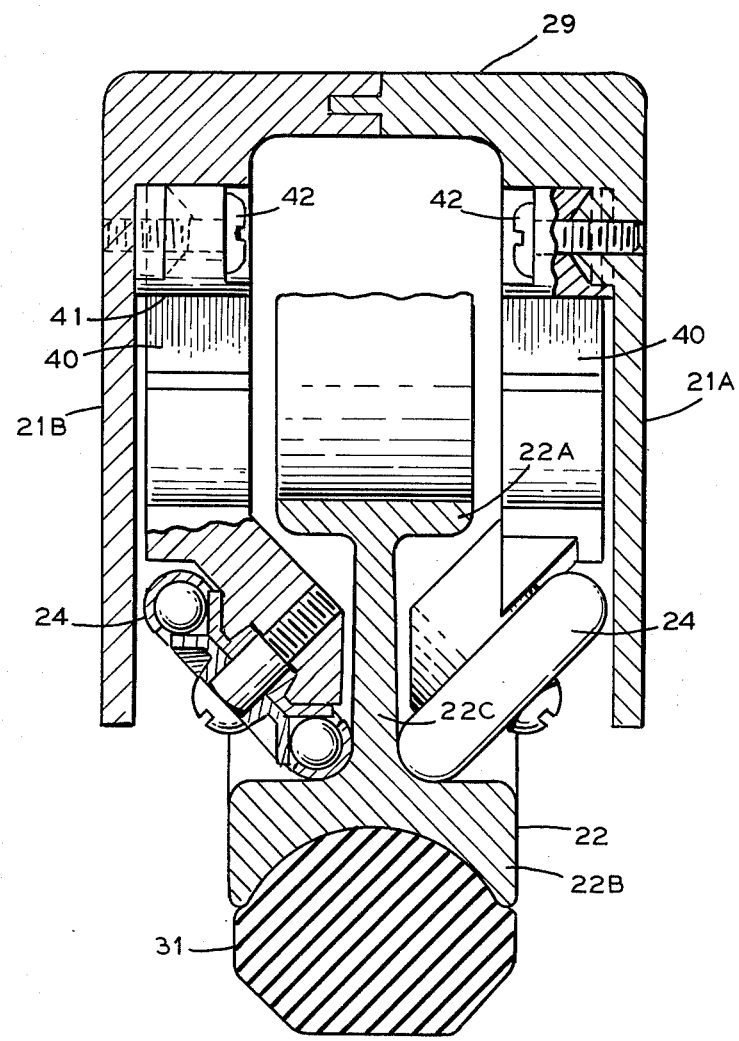
FIG. 10 is a sectional view taken along line 10—10 on FIG. 4.

As best seen in FIGS. 3 and 10 the rotor comprises an anular hoop 22 which is substantially I shape in cross section. The rotor 22 thus has an inner flange 22A and outer flange 22B and an interconnecting central web 22C. The convex outer surface of the external flange portion 22B of the rotor or hoop 22 is in contact with a tire 31 which may be either solid or pneumatic. In the illustrated embodiment a solid tire 31 is shown.

Figure 8:
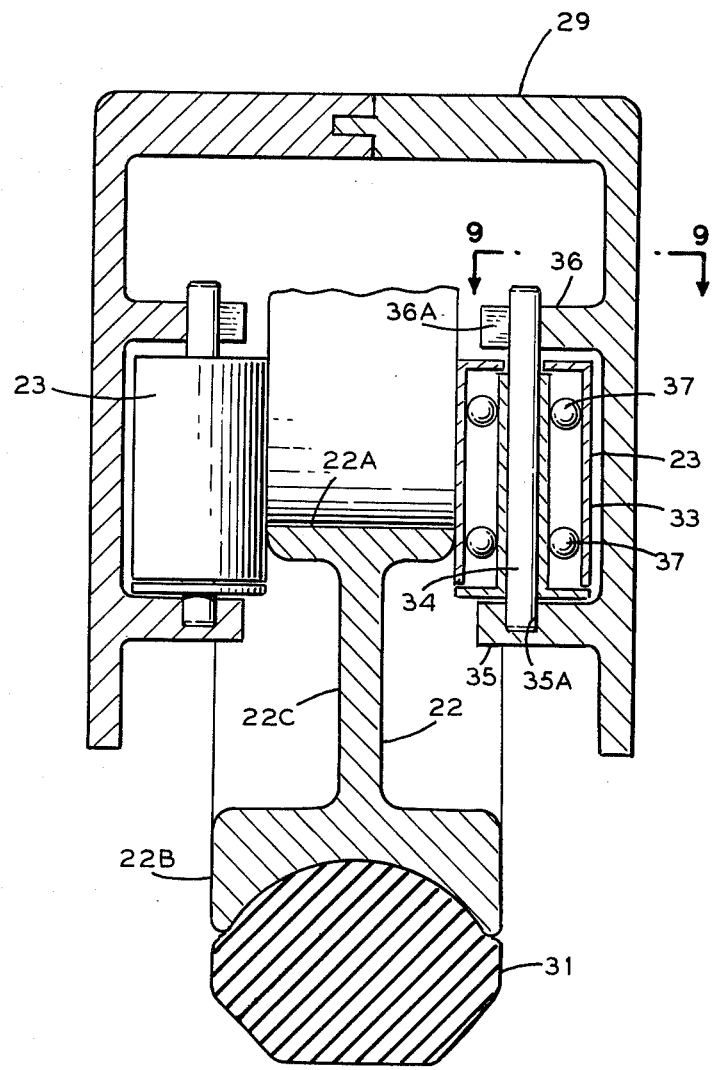
FIG. 8 is a sectional view taken along line 8—8 on FIG. 1.
Figure 9:
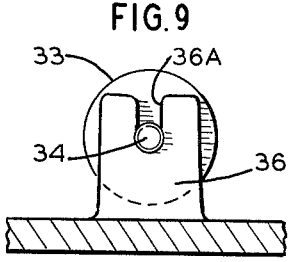
FIG. 9 is a detailed sectional view taken along line 9—9 on FIG. 8.

To hold the rotor 22 in its plane of rotation centering bearings 23 are circumferentially placed about the shroud on both sides of the rotor 22. As best seen in FIGS. 6, 7, and 8 and 9, each lateral or centering bearing includes a roller 33 which is rotatably journalled about a shaft 34 which is detachably held between spaced bearing supports 35 and 36. Referring to FIG. 8, the respective centering bearing supports 35 and 36 may be an integral part of the shroud members 21A and 21B. One centering bearing support is formed in a hole 35A for accommodating one end of the bearing shaft 34. The other centering bearing support 36 is provided with a bifurcate or yoke 36A for receiving the other end of the roller shaft 34. The end of the shaft 34 received in the yoke 36 is frictionally retained therein. With this type of support the centering bearing 23 can be readily put in or removed from the shroud. As seen in FIG. 8, the centering bearings are arranged in pairs about the circumference of the shroud and are disposed in rolling engagement with the innner flange 22A of the rotor 22. Ball bearings 37 can be disposed within the roller bearing 23 to minimize friction.

Figure 11:
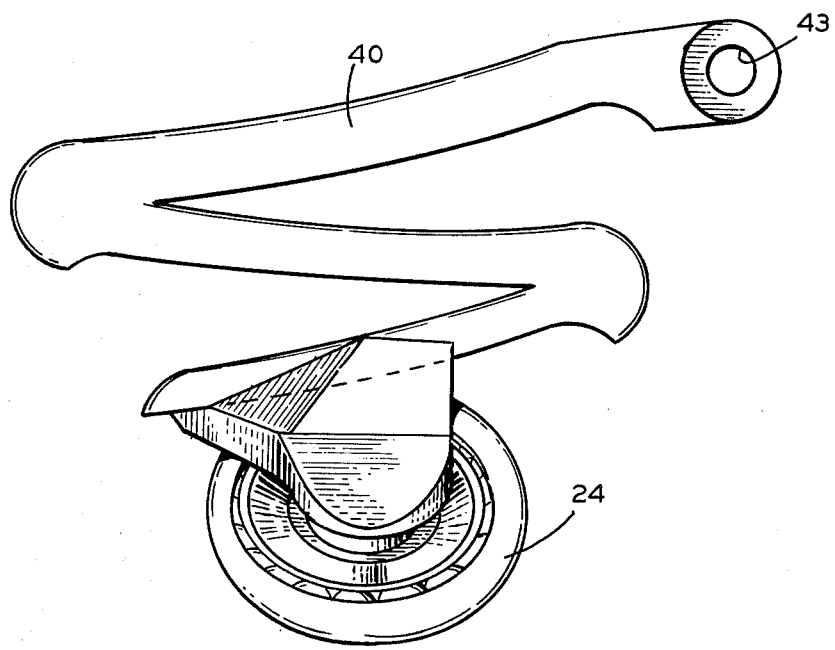
FIG. 11 is an enlarged detail of a resiliently mounted roller bearing utilized in the construction of the spokeless wheel assembly of FIG. 1 and 2.
Figure 12:
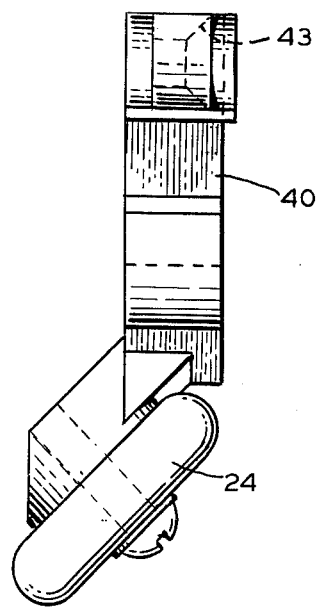
FIG. 12 is an end view of the rolling bearing and resilient mount detail of FIG. 11.

To rotatably retain the rotor within the shroud, circumferentially spaced rotating or sliding bearings 24 are provided. As best seen in FIGS. 4, 10, 11 and 12, each bearing 24 is connected to the end of a zig-zag type of leaf spring or resilient member 40 as shown in FIGS. 10, 11 and 12.

Integrally formed on the inner surface of the respective shroud members 21A, 21B are circumferentially spaced recesses or detents 41 (FIG. 4) for accommodating an end portion of the zig-zag spring 40. (FIG. 11). A screw or bolt 42 (FIG. 10) through hole 43 in the proximal spring leg may be used to secure the string 40 to the shroud. Connected to the distal leg of the zig-zag spring 40 is a roller bearing 24. As best seen in FIG. 10, the respective bearings 24 connected to the end of the spring 40 are angularly disposed and engage the rotor at an angle. The bearings 24 may also be disposed in a plane parallel to rotor web 22C.

As seen in FIG. 10, the respective roller bearings 24 engage the wheel either along the outer flange 22B on opposite sides of the central web 22C or along the inner flange 22A. While only one roller bearing 24 is illustrated in FIG. 4, it will be understood that the roller bearings 24 are circumferentially located about the circumference of the shroud member as indicated by the dotted line. Thus the rotor 22 is rotatably journalled and retained in position within the shroud by bearings 24.

It will be noted that the springs 40 are resilient and thus absorb impact imparted to the rotor 22 as it rolls over the ground. The springs also function to transmit the load from the shroud 21 to the bearings 24. The springs 40 transmit torque forces from the shroud to the bearings 24 and thence to the rotor when the spokeless wheel functions as a steering wheel.

The shroud may be formed of various materials. In the illustrated embodiment, it is shown as formed of molded synthetic resin. The rotor 22 can also be formed of molded synthetic resin.

Figure 13:
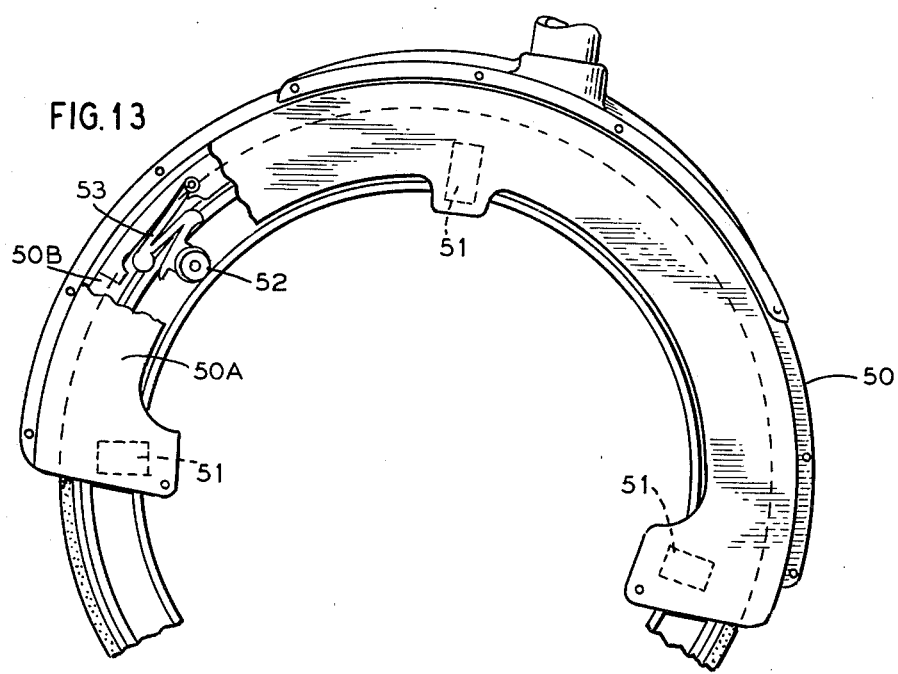
FIG. 13 is a modified spokeless wheel construction.

FIG. 13 illustrates a variant embodiment. In this embodiment the shroud 50 comprises a pair of complementary members 50A, 50B which are formed to extend through a limited circumferential portion of the wheel. This embodiment also includes lateral bearings 51 circumferentially placed about the shroud 50. Also roller bearings 52 resiliently mounted on leaf springs 43 of the type hereinbefore described are placed along the shroud 50. In all other respects the construction and function of the spokeless wheel assembly in FIG. 13 is similar to that hereinbefore described with respect to FIGS. 1 to 12.

From the foregoing it will be noted that the rotor is rotatably secured within its shroud and that the resilient engagement thereof absorbs impact imparted thereto. Also the arrangement is such that the spokeless wheel described can be readily substituted for the conventional steering wheel of a bicycle; since the post 26 (FIG. 1) can be inserted into the steering column of a conventional bicycle. However, it will be understood that the spokeless wheel described is not limited for use merely to bicycles. Also, if desired, the space confined by the rotor or hoop may be utilized for carrier purposes, e.g., a basket or carrier can be secured to the shroud and used as a means for carrying packages. Also the absence of spokes precludes the wringer and other types of injury commonly encountered with spoked wheels.

While the present invention has been described with respect to only some embodiments thereof, it will be readily appreciated and understood that variations and modifications may be made without departing from the spirit or scope of the invention.

What is claimed is:

1. A rotor and supporting shroud comprising means defining a rotor shroud,
   an annular rotor disposed within said shroud for rotation relative to said shroud,
   a plurality of centering bearings circumferentially spaced within said shroud,
   said centering bearings acting on said rotor to confine said rotor to one plane of rotation within said shroud,
   said centering bearings comprising rollers disposed in rolling engagement with said rotor,
   a plurality of circumferentially spaced load sustaining roller bearings for retaining said rotor within said shroud,
   means for resiliently mounting said load sustaining roller bearings to said shroud whereby said resiliently mounted bearings absorb the impact forces imparted to said rotor as said rotor rolls over said ground.
   wherein said annular shaped rotor includes inner and outer flanges interconnected by a web portion whereby said rotor is generally I-shaped in cross-section,
   and said rolling bearings are disposed in rolling engagement with said rotor on opposite sides of said web portion and between said inner and outer flanges, 2. A rotor and supporting shroud comprising means defining a rotor shroud,
   a rotor disposed within said shroud for rotation relative to said shroud,
   a plurality of centering bearings circumferentially placed within said shroud,
   said centering bearings acting on said rotor to confine said rotor to one plane of rotation within said shroud,
   a plurality of circumferentially spaced rolling bearings for retaining said rotor within said shroud,
   means for resiliently mounting said rolling bearings to said shroud whereby said resiliently mounted bearings absorb the impact forces imparted to said rotor as said rotor rolls over said ground,
   and said rotor includes spaced inner and outer flanges interconnected by a web portion whereby said rotor is generally I-shaped in cross section, and said rolling bearings are disposed in rolling engagement with said rotor on opposite sides of said web portion, and
   wherein said centering bearings comprise rollers disposed in rolling engagement with at least one of said flanges of said rotor.

3. The invention as defined in claim 2 wherein said resilient mounting means for each of said bearings comprises a resilient zig-zag spring.

4. The invention as defined in claim 3 and including means for fixedly securing one end of said zig-zag spring to said shroud, and said roller bearing being attached to the other end of said zig-zag spring.

5. The invention as defined in claim 4 wherein said rolling bearing is disposed in rolling engagement with said rotor at an angle of less than 90° to the rotor.

6. The invention as defined in claim 2 wherein said shroud means comprises a pair of mateable members, each of said members having an annular side wall portion, and a connected laterally extending top defining wall portion, said top wall portion extending over at least the upper half portion of said shroud, and said rotor extending beyond the lower half of said side wall portion.

7. The invention as defined in claim 6 and including a solid tire contiguous with the periphery of said rotor.

8. The invention as defined in claim 2 wherein said shroud means comprises a pair of complementary members having a side wall portion and a connected top wall portion,
said members extending over an arcuate portion of said wheel to define a shroud for only a circumferential upper portion of said rotor,
and means for securing said shroud members together.

9. The invention as defined in claim 2 and including means for detachably securing said centering bearings to said rotor shroud.

10. The invention as defined in claim 6 wherein said pair of shroud members are identical in form.

11. The invention as defined in claim 6 wherein said shroud members are formed of synthetic resin.

12. The invention as defined in claim 2 wherein said resilient mounting means are formed of a plastic material.

13. A rotor and supporting shroud comprising:
a rotor shroud, said rotor shroud including a pair of complementary shroud members,
each of said shroud members having a side wall portion and a connected top portion,
means for securing said shroud members together,
a rotor disposed within said wheel shroud,
said rotor being generally I-shaped in cross section having an inner and outer flange interconnected by a web portion,
a plurality of oppositely disposed centering bearings journalled on said shroud members,
said centering bearings being circumferentially placed about said shroud, and
said centering bearings being in rolling engagement with the inner flange of said rotor to laterally stabilize said rotor in its plane of rotation,
a series of load sustaining rolling bearings disposed in rolling engagement with said rotor,
said rolling bearings being circumferentially placed in pairs about said shroud so as to be disposed on opposite sides of said rotor,
means for resiliently mounting each of said rolling bearings,
said resilient means comprising a zig-zag spring,
means for securing one end of said spring to a shroud member, and
said roller bearing being connected to the other end of said spring at an angle thereto whereby said roller bearing is disposed in rolling engagement with said rotor at an angle less than 90° to the rotational plane of said rotor.

14. A rotor and supporting shroud comprising:
means defining a rotor shroud,
a rotor defined as an annular member disposed within said shroud for rotation relative thereto,
said annular member having a reduced cross-sectional portion between the inner and outer periphery thereof,
and a plurality of spaced apart load sustaining rolling bearing means circumferentially spaced about said shroud for retaining said annular member within said hroud for relative rotation thereto,
each of said load sustaining rolling bearing means including a pair of spaced apart bearings oppositely disposed to either side of said annular member,
each of said pair of bearings being angled to engage the reduced cross sectional portion of said annular member,
and means for resiliently mounting said bearings on said shroud for absorbing the impact forces imparted to said annular member as said annular member rolls over the ground.

15. A rotor and supporting shroud comprising means defining a rotor shroud,
an annular rotor disposed within said shroud for rotation relative to said shroud,
a plurality of centering bearings circumferentially spaced within said shroud,
said centering bearings acting on said rotor with a lateral bias to confine said rotor to a vertical plane of rotation within said shroud,
said centering bearings comprising rollers disposed on opposite sides of said rotor and disposed in rolling engagement with said rotor,
a plurality of circumferentially spaced load sustaining roller bearings for retaining said rotor within said shroud,
means for resiliently mounting each of said load sustaining roller bearings to said shroud whereby said resiliently mounted bearings absorb the impact forces imparted to said rotor as said rotor rolls over the ground,
said roller bearings being circumferentially spaced about said shroud and rotor disposed therein so as to be disposed on opposite sides of said rotor.

16. The invention as defined in claim 15 and including a fork member attachable to said shroud for connecting said spokeless wheel to a vehicle, e.g., a bicycle.

* * * * *